US011947300B2

(12) United States Patent
Takada et al.

(10) Patent No.: US 11,947,300 B2
(45) Date of Patent: Apr. 2, 2024

(54) CUTTING APPARATUS AND IMAGE FORMING SYSTEM

(71) Applicant: CANON KABUSHIKI KAISHA, Tokyo (JP)

(72) Inventors: Atsushi Takada, Abiko (JP); Tadashi Iwakawa, Tokyo (JP); Rin Ishikawa, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/854,218

(22) Filed: Jun. 30, 2022

(65) Prior Publication Data

US 2022/0334524 A1 Oct. 20, 2022

Related U.S. Application Data

(63) Continuation of application No. 16/890,088, filed on Jun. 2, 2020, now Pat. No. 11,409,221.

(30) Foreign Application Priority Data

Jun. 5, 2019 (JP) ................................ 2019-105713

(51) Int. Cl.
*G03G 15/00* (2006.01)
*B65H 35/00* (2006.01)

(52) U.S. Cl.
CPC ..... *G03G 15/6523* (2013.01); *B65H 35/0086* (2013.01)

(58) Field of Classification Search
CPC .................................................. G03G 15/6523
See application file for complete search history.

(56) References Cited

U.S. PATENT DOCUMENTS 8,396,410 B2 3/2013 Yokoya et al.
2009/0039585 A1 2/2009 Hayashi et al.
(Continued)

FOREIGN PATENT DOCUMENTS

JP 2003-341919 A 12/2003
JP 2008-120517 A 5/2008
(Continued)

OTHER PUBLICATIONS

Office Action dated Dec. 14, 2021, in Japanese Patent Application No. 2019-105713.
(Continued)

*Primary Examiner* — Walter L Lindsay, Jr.
*Assistant Examiner* — Andrew V Do
(74) *Attorney, Agent, or Firm* — Venable LLP

(57) ABSTRACT

An image forming system includes an image forming apparatus, a cutting apparatus, and a controller. The cutting apparatus includes a conveyance path, a first cutting unit configured to cut, at a cutting position with respect to a conveyance direction of the sheet on the conveyance path, the sheet in a width direction perpendicularly intersecting with the conveyance direction, and a second cutting unit configured to cut, at a cutting position with respect to the width direction, the sheet in the conveyance direction. The controller is configured to control the cutting apparatus such that, in a case where the sheet is cut neither with the first cutting unit nor with the second cutting unit, the sheet is conveyed through the conveyance path with the first cutting unit and the second cutting unit retreated not to contact with the sheet passing through the conveyance path.

20 Claims, 11 Drawing Sheets

(56) References Cited

U.S. PATENT DOCUMENTS

| | | | |
|---|---|---|---|
| 2013/0136520 | A1 | 5/2013 | Kaneda |
| 2019/0079445 | A1 | 3/2019 | Wakabayashi |
| 2020/0317461 | A1 | 10/2020 | Toyoizumi et al. |

FOREIGN PATENT DOCUMENTS

| | | | |
|---|---|---|---|
| JP | 2009-056798 | A | 3/2009 |
| JP | 2013-111931 | A | 6/2013 |
| JP | 2013-212895 | A | 10/2013 |
| JP | 2016-185849 | A | 10/2016 |
| JP | 2019-048692 | A | 3/2019 |
| JP | 2020-169088 | A | 10/2020 |

OTHER PUBLICATIONS

Office Action dated Jun. 6, 2023, in Japanese Patent Application No. 2022-095836.
English-language translation of Office Action dated Jun. 6, 2023, in Japanese Application No. 2022-095836.

CUTTING APPARATUS AND IMAGE FORMING SYSTEM

This is a continuation of U.S. patent application Ser. No. 16/890,088, filed Jun. 2, 2020.

BACKGROUND OF THE INVENTION

Field of the Invention

The present invention relates to a cutting apparatus to cut a sheet and an image forming system to form an image on the sheet.

Description of the Related Art

A postprocessing apparatus, which is disposed downstream of an image forming apparatus such as a copy machine and a printer and performs a process such as a binding process of a printed recording material, is widely known, but has recently diversified a function thereof. Japanese Patent Laid-Open No. 2003-341919 describes the postprocessing apparatus, with a creep correction mechanism, which cuts an edge of a saddle-stitched sheet bundle and aligns the sheet bundle after a cutting process. Further, Japanese Patent Laid-Open No. 2016-185849 describes the postprocessing apparatus which has a line-making mechanism to provide a folding line on a sheet in preparation for a folding process and has a top/bottom trimmer to cut a top/bottom margin of the sheet.

However, as the edge of the saddle-stitched sheet bundle is cut in Japanese Patent Laid-Open No. 2003-341919, hitherto the postprocessing apparatus did not have a capability to cut the sheet one sheet at a time in four directions thereof. Therefore, it was difficult to address a demand to obtain a single sheet rimless printed product, such as a poster, as products of the image forming system. Further, in the postprocessing apparatus described in Japanese Patent Laid-Open No. 2016-185849, since a conveyance path to perform processes of the sheet by using the line-making mechanism and the top/bottom trimmer and a conveyance path not to perform such the processes are branched and merged in the postprocessing apparatus, a configuration of the apparatus is complicated.

SUMMARY OF THE INVENTION

The present invention provides a cutting apparatus and an image forming system with a simple configuration and capable of cutting a sheet one sheet at a time at an arbitrary position.

According to one aspect of the invention, an image forming system includes: an image forming apparatus configured to form images on a plurality of sheets one sheet at a time; a cutting apparatus configured to perform a cutting process of a sheet on which an image has been formed by the image forming apparatus, one sheet at a time; and a controller configured to control the cutting apparatus The cutting apparatus includes: a conveyance path configured to convey the sheet received from the image forming apparatus; a first cutting unit disposed on the conveyance path and configured to cut, at a cutting position with respect to a conveyance direction of the sheet on the conveyance path, the sheet in a width direction perpendicularly intersecting with the conveyance direction; and a second cutting unit disposed on the conveyance path and configured to cut, at a cutting position with respect to the width direction, the sheet in the conveyance direction. The controller is configured to control the cutting apparatus such that, in a case where the sheet is cut neither with the first cutting unit nor with the second cutting unit, the sheet is conveyed through the conveyance path with the first cutting unit and the second cutting unit retreated not to contact with the sheet passing through the conveyance path.

According to another aspect of the invention, a cutting apparatus, to be connected to an image forming apparatus, includes: a conveyance path to convey a sheet received from an image forming apparatus, one sheet at a time; a first cutting unit disposed on the conveyance path and configured to cut, at a cutting position with respect to a conveyance direction of the sheet on the conveyance path, the sheet in a width direction perpendicularly intersecting with the conveyance direction; and a second cutting unit disposed on the conveyance path, and configured to cut, at a cutting position with respect to the width direction, the sheet in the conveyance direction. The cutting apparatus is configured to, in a case where the sheet is cut neither with the first cutting unit nor with the second cutting unit, pass the sheet through the conveyance path with the first cutting unit and the second cutting unit retreated not to contact with the sheet passing through the conveyance path.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the attached drawings.

First Embodiment

Figure 1:
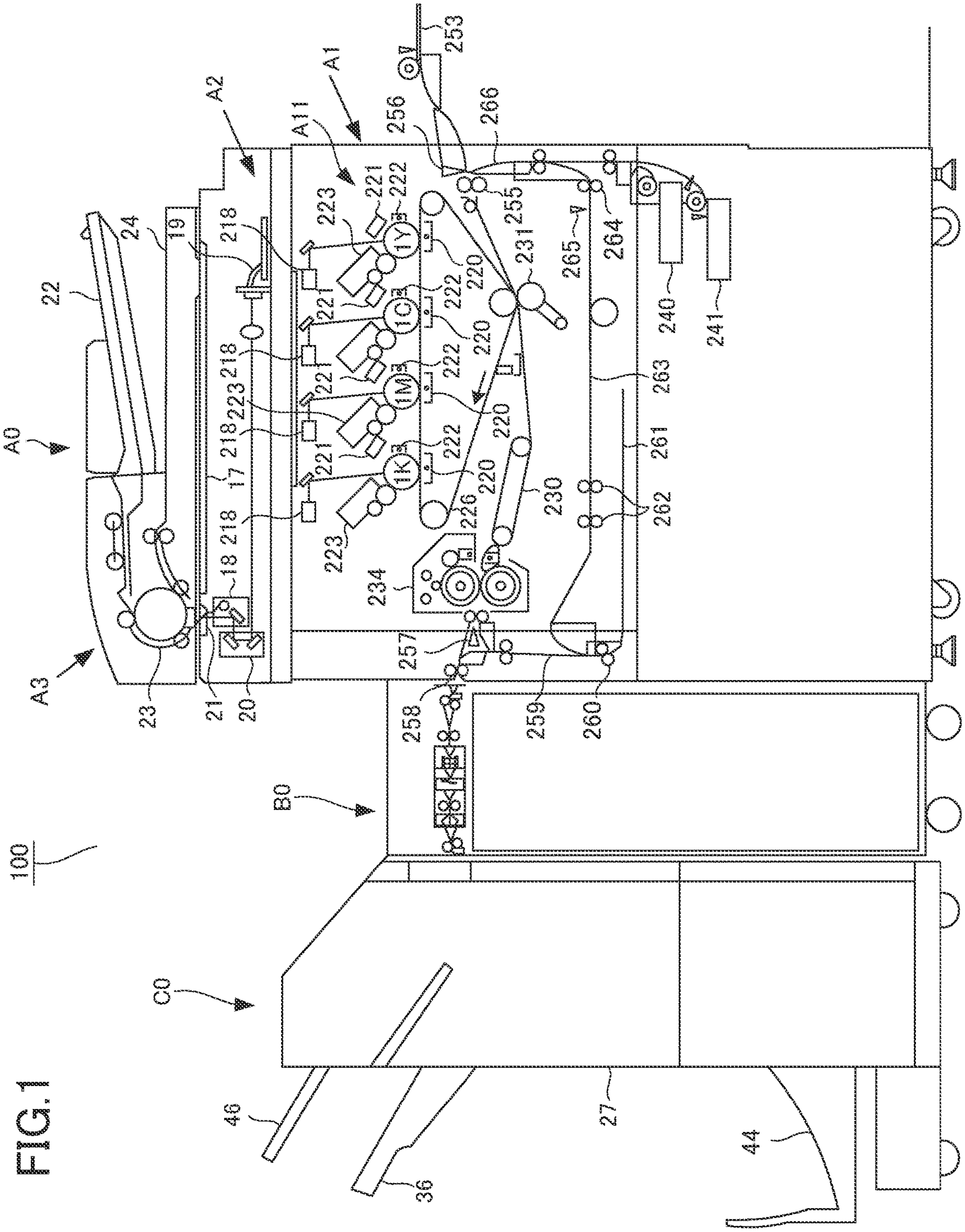
FIG. 1 is a general configuration of an image forming system according to a first embodiment.

FIG. 1 schematically shows a general configuration of an image forming system 100 according to a first embodiment.

As shown in FIG. 1, the image forming system 100 includes an image forming apparatus A0, and a sheet cutting apparatus B0 and a sheet processing apparatus C0 attached thereto. The image forming apparatus A0 includes an image forming unit A1, which is an apparatus body, and a scanner unit A2 and a feeder unit A3, which constitute an image reading apparatus.

1. Image Forming Apparatus

The image forming unit A1 mounts an image forming unit A11 which is an electrophotographic unit of an intermediate transfer tandem type. The image forming unit A11 forms toner images of yellow, magenta, cyan, and black on 4 photosensitive members 1Y, 1M, 1C, and 1K, respectively, by an electrophotographic process, and transfers the toner images onto a recording material via an intermediate transfer member. As the recording material, it is acceptable to use various sheets which are different in sizes and materials including, but not limited to, a sheet of paper such as a standard paper and a cardboard, a plastic film, a cloth, a sheet material with a surface treatment such as a coated paper, a sheet material of a special shape such as an envelope and an index sheet.

In adjacencies of each of the photosensitive members from 1Y to 1K, a primary charge unit 221, an exposing unit 218, a developing unit 223, a transfer charge unit 220, and a cleaner unit 222 are disposed. The primary charge unit 221 charges each surface of the photosensitive members from 1Y to 1K uniformly, and the exposing unit 218 exposes the photosensitive members from 1Y to 1K based on a signal transmitted from a control unit of the image forming apparatus A0 in accordance with image information for printing and bears an electrostatic latent image on each surface of the photosensitive members. The developing unit 223 supplies respective colors of toners to the photosensitive members from 1Y to 1K, and visualizes the electrostatic latent image as the toner images. The toner images developed with the developing unit 223 and born on the photosensitive members from 1Y to 1K are multiply transferred onto a transfer belt 226, which is an intermediate transfer member, and a toner image of a full color is formed by superimposing 4 colors of the toner images each other. An adhesive material such as the toner which has not been transferred onto the transfer belt 226 and remained on the photosensitive members from 1Y to 1K is removed with the cleaner unit 222. Then, an electrostatic charge on each surface of the photosensitive members from 1Y to 1K is neutralized with a charge neutralization device, and the photosensitive members from 1Y to 1K are prepared for the next electrophotographic process.

The sheet for use as the recording material stored in cassettes 240 and 241 or set on a manual sheet feed portion 253 is fed one sheet at a time via a feed path 266, and conveyed to a registration roller pair 255 disposed on the feed path 266. When a sheet passage was detected with a registration sensor 256 disposed immediately in front of the registration roller pair 255, a conveyance of the sheet with a plurality of conveyance rollers disposed upstream of the registration roller pair 255 is temporarily stopped after an appropriate time has elapsed from the detection. Consequently, a sheet skew is corrected by abutting the sheet on the registration roller pair 255, which is stopping, and a front edge of the sheet in a conveyance direction is fixed along a nip of the registration roller pair 255 in a direction perpendicular to the conveyance direction. After this sheet skew correction process (also called as a registration correction), the sheet is supplied to a secondary transfer unit 231 by starting the registration roller pair 255.

In the secondary transfer unit 231, the toner image born on the transfer belt 226 is secondarily transferred onto the sheet fed as described above. The sheet with a transferred unfixed toner image is conveyed to a fixing unit 234 via a fixing conveyance belt 230. The fixing unit 234 includes a pair of rotary members to nip the sheet and a heat source, such as a halogen lamp, to heat the toner image on the sheet, and performs a fixing process by applying heat and pressure to melt the toner image. In a case where the sheet is discharged without further processing, the sheet passed through the fixing unit 234 is guided toward a discharge path 258 with a discharge flap 257 and discharged to the sheet cutting apparatus B0.

To be noted, the image forming unit A1 is capable of continuously feeding sheets from the cassettes 240 and 241 and the manual sheet portion 253. In this case, by taking into account a length of a preceding sheet, a feed timing and a conveyance speed from the cassettes 240 and 241 and the manual sheet feed portion 253 are controlled to feed the sheets at a minimum interval such that the sheets do not overlap each other. The registration roller pair 255 is temporarily stopped after sending out the preceding sheet to the secondary transfer unit 231 by stopping a drive transmission from a clutch, and prepared for the registration correction of a succeeding sheet.

An operation performed in a case of a double-sided image formation will be described. After an image has been formed on a first surface of the sheet as described above, in a case where the image is to be formed on a second surface of the sheet, the sheet is guided toward a rear surface path 259 with the discharge flap 257. A reverse conveyance roller pair 260 disposed on the rear surface path 259 temporarily conveys the sheet to a reverse conveyance path 261, and thereafter delivers the sheet to a duplex path 263 in a switchback manner by reversing rotation thereof.

Then, the sheet is conveyed toward a refeeding roller pair 264 via the duplex path 263. When the passage of the sheet is detected with a refeeding sensor 265 disposed immediately in front of the refeeding roller pair 264, the sheet conveyance on the duplex path 263 is suspended, and the sheet temporarily stops with the sheet abutting on the refeeding roller pair 264, which is stopping. Herewith, the sheet skew generated in a section between a transfer of the image on the first surface of the sheet and an arrival of the sheet on the refeeding roller pair 264 is corrected (so called as refeeding registration correction). Thereafter, by starting the refeeding roller pair 264, the sheet arrives at the registration roller pair 255 again with the first and the second surface of the sheet reversed, and the image is formed on the second surface of the sheet by passing through the secondary transfer unit 231 and the fixing unit 234. Then, the sheet with the image formed on both surfaces of the sheet is guided toward the discharge path 258 with the discharge flap 257, and discharged to the sheet cutting apparatus B0.

The image forming unit A11 disposed in the image forming unit A1 described above is an example of the image forming unit, and it is acceptable to use, for example, the electrophotographic unit of a direct transfer system which transfers the toner image formed on the photosensitive member onto the sheet without mediated with the intermediate transfer member. Further, it is not limited to an electrophotographic system, and acceptable to use an ink jet system printing mechanism or an offset printing mechanism for the image forming unit.

The scanner unit A2 disposed on the image forming unit A1 includes a platen 17 and a carriage 18 which moves reciprocally along the platen 17. The scanner unit A2 further includes a photoelectric conversion unit 19 such as a charge coupled device, and a reduction optical unit 20 to guide a reflected light from a document on the platen 17 received by the carriage 18 to the photoelectric conversion unit 19. The photoelectric conversion unit 19 performs a photoelectric conversion of an optical output from the reduction optical unit 20 into image data, and outputs to the image forming unit A1 as an electric signal.

Further, the scanner unit A2 includes a travelling platen 21 to read the sheet fed from the feeder unit A3. The feeder unit A3 includes a sheet feed tray 22, a sheet feed path 23 to guide the sheet sent out from the sheet feed tray 22 to the traveling platen 21, and a sheet discharge tray 24 to store the document passed through the traveling platen 21. The document fed from the sheet feed tray 22 one document at a time is optically scanned at a time of passing through the traveling platen 21 with the carriage 18 and the reduction optical unit 20, and the image data which is photoelectrically converted with the photoelectric conversion unit 19 is sent to the image forming unit A1.

2. Sheet Cutting Apparatus

Figure 2:
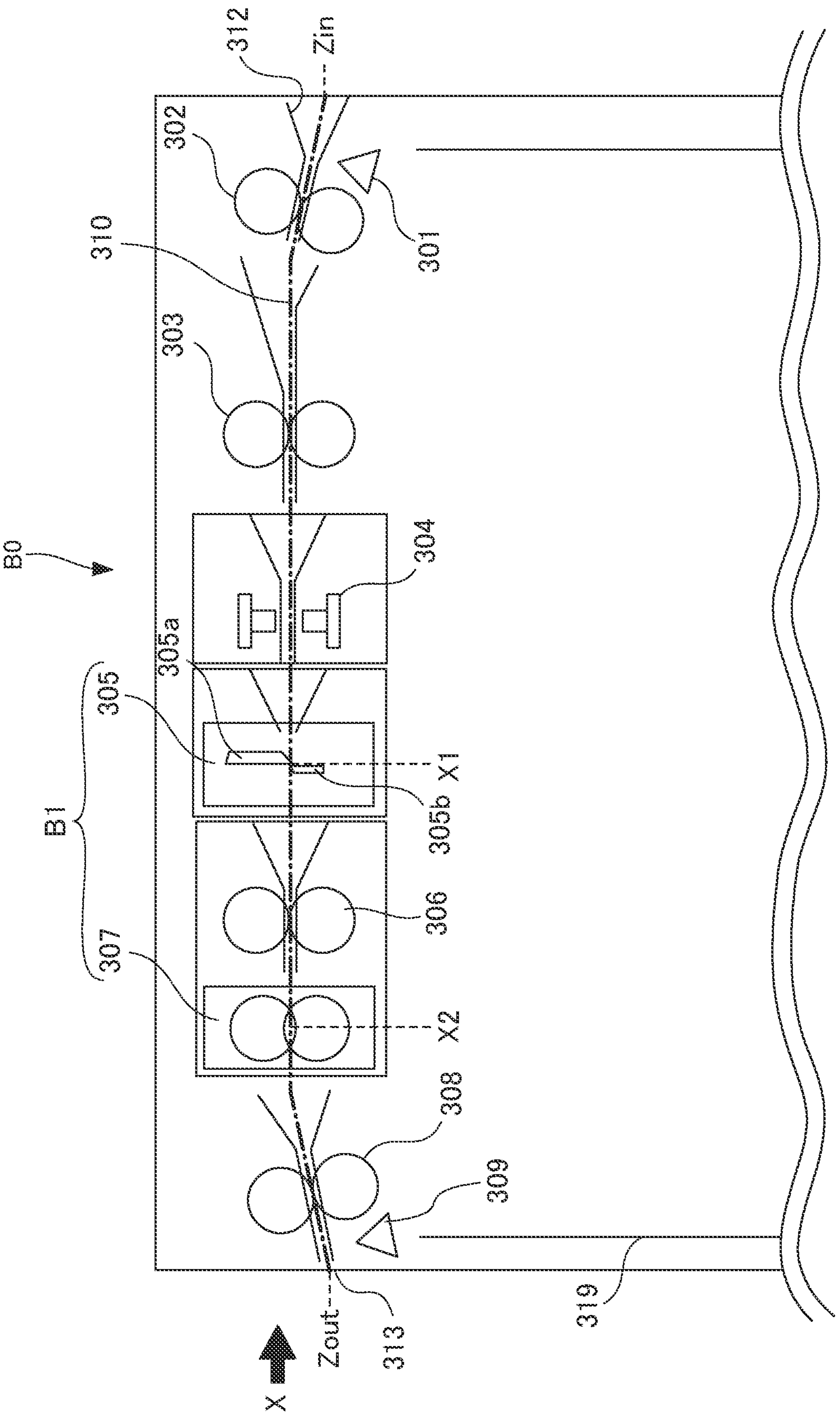
FIG. 2 is a configuration diagram of a sheet cutting apparatus according to the first embodiment.

FIG. 2 shows a configuration of the sheet cutting apparatus B0 which cuts the sheet on which the image has been formed by the image forming apparatus A0. The sheet cutting apparatus B0 includes a front/rear cutter unit 305, a top/bottom cutter unit 307, a conveyance path 310, and a chip storage box 319. The front/rear cutter unit 305 is a first cutting unit of this embodiment, and the top/bottom cutter unit 307 is a second cutting unit of this embodiment. The front/rear cutter unit 305 and the top/bottom cutter unit 307 compose a cutting portion B1 which performs a cutting process in the sheet cutting apparatus B0.

The front/rear cutter unit 305 cuts the sheet in a width direction (a main scanning direction at a time of an image formation) perpendicular to a conveyance direction of the sheet (a leftward direction in the figure) on the conveyance path 310. The front/rear cutter unit 305 is able to divide the sheet into pieces with a prescribed length, other than trimming a front end portion and/or a rear end portion (i.e., a leading end portion and/or a trailing end portion) of the sheet in the sheet conveyance direction.

The top/bottom cutter unit 307 cuts the sheet in the conveyance direction of the sheet (a sub-scanning direction at the time of the image formation). The top/bottom cutter unit 307 is able to divide the sheet into pieces with a prescribed width by changing a cutter blade, other than trimming a top/bottom portion of the sheet. The top/bottom portion refers to a portion of the sheet that will be a top and a bottom of the two-folded sheet which is folded by performing a folding process with a sheet processing apparatus C0 described later, i.e., side end portions of the sheet in the width direction perpendicular to the conveyance direction.

The conveyance path 310, which is a conveyance path of this embodiment, extends linearly in a horizontal direction over a range of a position X1, where the sheet is cut with the front/rear cutter unit 305, to a position X2, where the sheet is cut with the top/bottom cutter unit 307. In other words, components constituting an upper and a lower guide surface of the conveyance path 310 are disposed at positions not intersecting with an imaginary line connecting these positions X1 and X2. Accordingly, the front/rear cutter unit 305 and the top/bottom cutter unit 307 are able to cut the sheet spreading in a planar shape on the conveyance path 310. Therefore, this configuration is advantageous for improving a cutting accuracy and reducing a conveyance load of a high stiffness sheet. The conveyance path 310 is, in particular, composed with a guide portion supported with a frame member of the sheet cutting apparatus B0 and a guide portion provided at the front/rear cutter unit 305 and the top/bottom cutter unit 307.

The sheet cutting apparatus B0 of this embodiment is disposed, in the horizontal direction, between the image forming apparatus A0 and the sheet processing apparatus C0 (FIG. 1), and the conveyance path 310 extends from one side to another side (from right to left in the figure) in the horizontal direction. The conveyance path 310 includes a sheet receiving port 312 facing a sheet discharge port through which the sheet subjected to the image formation is discharged from the image forming unit A1, and a sheet discharge port 313 facing a sheet receiving port through which the sheet processing apparatus C0 receives the sheet. The sheet receiving port 312 is disposed on the one side of lateral surfaces of the sheet cutting apparatus B0 in the horizontal direction, and the sheet discharge port 313 is disposed on the other side of the lateral surfaces of the sheet cutting apparatus B0 in the horizontal direction. Then, as two cutter units are disposed on the approximately horizontally extending conveyance path 310, the front/rear cutter unit 305 and the top/bottom cutter unit 307 are disposed on a linear line connecting an opening position Zin of the sheet receiving port 312 and an opening position Zout of the sheet discharge port 313. To be noted, the opening positions Zin and Zout of the sheet receiving port 312 and the sheet discharge port 313 are passage positions at which the sheet passes through the respective opening positions in a normal posture.

On the conveyance path 310, other than the front/rear cutter unit 305 and the top/bottom cutter unit 307, an inlet roller pair 302, a registration roller pair 303, an intermediate roller pair 306, and a discharge roller pair 308 are disposed as conveyance units to convey the sheet. In addition, a lateral registration detection sensor 304 is disposed on the conveyance path 310 between the registration roller pair 303 and the cutting portion B1. Further, in adjacencies of the sheet receiving port 312 of the conveyance path 310, an inlet sensor 301 is disposed to detect an import of the sheet, and an exit sensor 309 is disposed to detect a discharge of the sheet in adjacencies of the sheet discharge port 313.

The sheet discharged one by one with a discharge roller pair disposed on the discharge path 258 (FIG. 1) of the image forming unit A1 is received with the inlet roller pair 302 of the sheet cutting apparatus B0 via the sheet receiving port 312 of the conveyance path 310, and conveyed toward the registration roller pair 303. At this time, the inlet sensor 301 detects the passage of each sheet.

When a predetermined time has elapsed after the inlet sensor 301 detected the passage of the sheet, the inlet roller pair 302 temporarily stops the conveyance of the sheet. Therefore, the sheet abuts on the registration roller pair 303, which is stopping, and a sheet skew of a succeeding sheet is corrected (registration correction) by fixing the front end portion of the sheet in the direction perpendicular to the conveyance direction along a nip portion of the registration roller pair 303. Thereafter, the sheet is conveyed to the front/rear cutter unit 305 by starting the registration roller pair 303.

Figure 3:
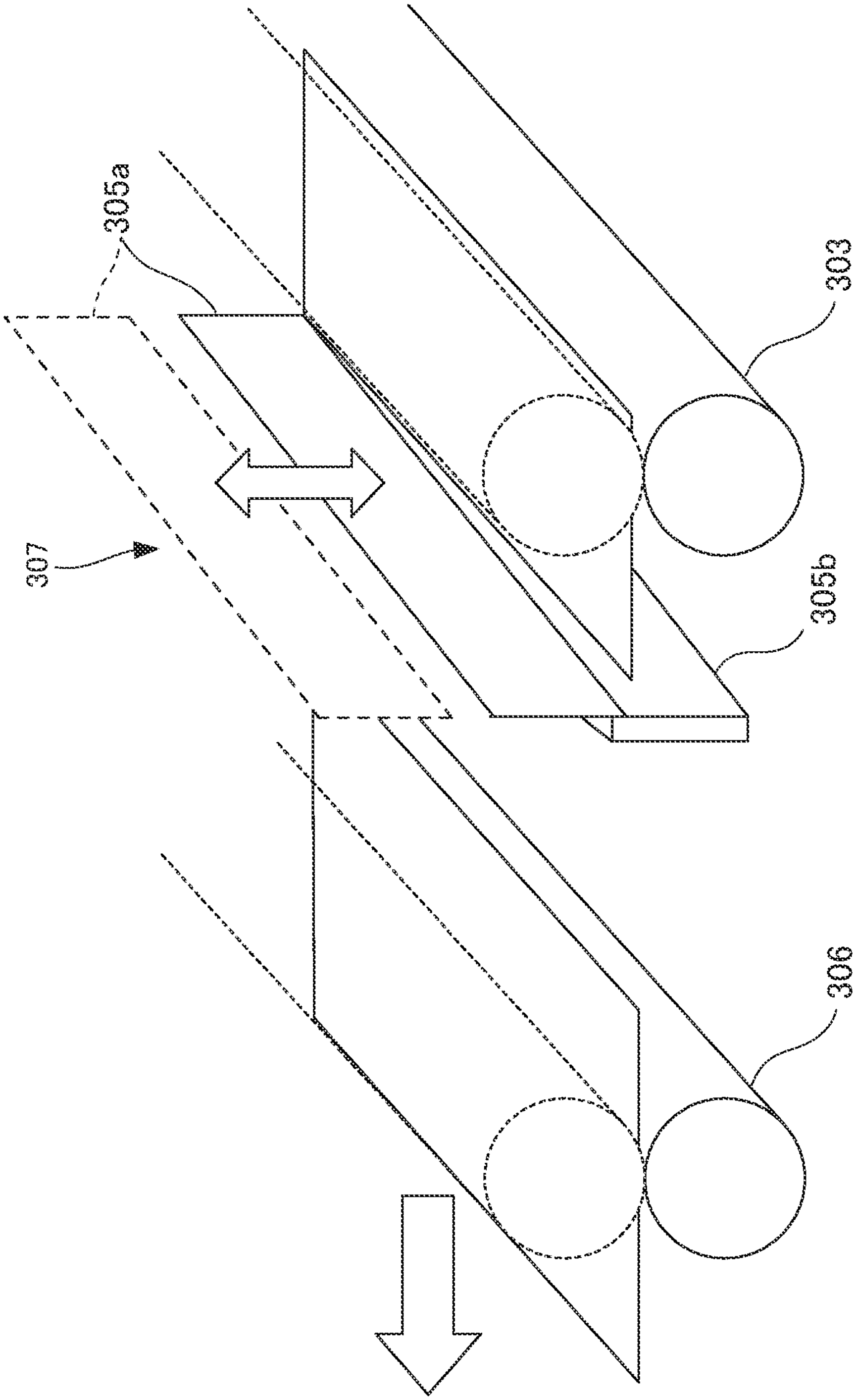
FIG. 3 is a perspective view of a front/rear cutter unit according to the first embodiment.

FIG. 3 is a perspective view of the front/rear cutter unit 305. The front/rear cutter unit 305 includes a guillotine blade 305*a* extending in the width direction perpendicularly intersecting with the conveyance direction of the sheet, and cuts the sheet along the width direction by vertically moving the guillotine blade 305*a* against an opposing stationary blade 305*b* with a drive unit. That is, a moving direction of the guillotine blade 305*a*, which is a first cutting blade of this embodiment, is vertical. A cutting position of the sheet is determined based on an instruction of a cutting amount transmitted from the control unit of the image forming apparatus A0 to the sheet cutting apparatus B0. In this embodiment, after the sheet has been conveyed by as much as a feeding amount, corresponding to the cutting amount, with the registration roller pair 303 and the intermediate roller pair 306 shown in FIG. 2, the sheet is temporarily stopped, and is cut at the position. By cutting the sheet with the front/rear cutter unit 305 in the width direction, a length of the sheet measured in the conveyance direction of the conveyance path (i.e., in a top-bottom direction of the sheet folded in center with the sheet processing apparatus C0) is determined.

In a case where a sheet of the sheet is cut a plurality of times, the cutting process is performed by moving the guillotine blade 305*a* vertically a plurality of times, while the registration roller pair 303 and the intermediate roller pair 306 are repeatedly being driven and temporarily stopped. Then, in a case where the length of the sheet in the conveyance direction after a cutting is short, if necessary, after the cutting of the top/bottom portion of the sheet with the top/bottom cutter unit 307, the sheet is conveyed backward with the intermediate roller pair 306, and the rear end portion of the sheet is cut with the guillotine blade 305a.

The sheet cut with the front/rear cutter unit 305 is conveyed to the top/bottom cutter unit 307 with the intermediate roller pair 306.

Figure 4:
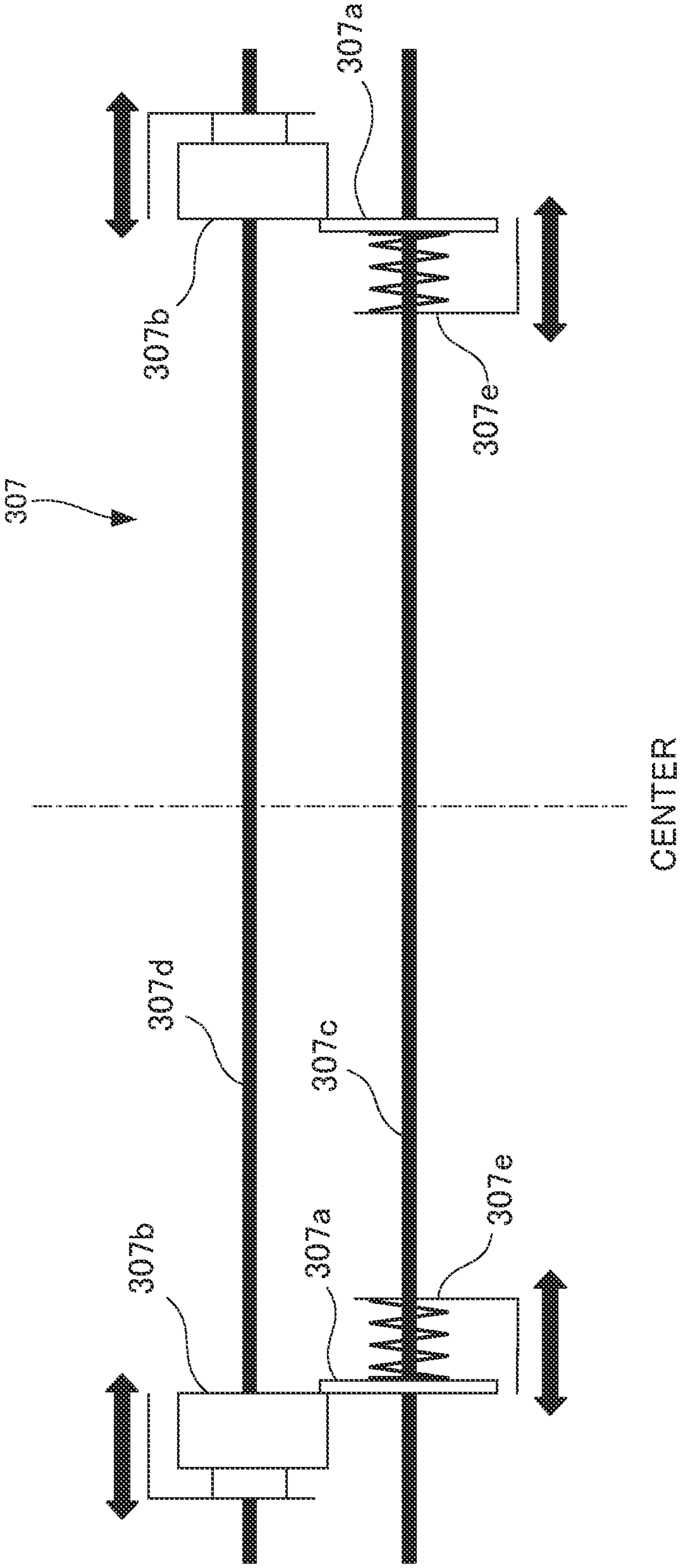
FIG. 4 is a side view of a top/bottom cutter unit according to the first embodiment.

FIG. 4 is a diagram of the top/bottom cutter unit 307 viewed from downstream in the conveyance direction (from a viewpoint of an arrow X in FIG. 2). The top/bottom cutter unit 307 includes a cutter blade 307*a* in a disk shape and an abutting disk 307*b*. The cutter blade 307*a*, which is a second cutting blade of this embodiment, is a blade which cuts the sheet while rotating. The cutter blade 307*a* and the abutting disk 307*b* are rotatably supported with a rotation shaft 307*c* and 307*d*, respectively, and abutting each other in the conveyance path. At a time of cutting the sheet, an engagement portion of the cutter blade 307*a* and the abutting disk 307*b* receives the sheet in a state where the cutter blade 307*a* is urged to the abutting disk 307*b* with an urging spring 307*e*, and the sheet is continuously cut while being conveyed. By cutting the sheet with the top/bottom cutter unit 307 in a cutting direction, a length of the sheet measured in the width direction of the conveyance path (i.e., in the top-bottom direction of the sheet folded in the center with the sheet processing apparatus C0) is determined.

In the top/bottom cutter unit 307, a pair of the cutter blade 307*a* and the abutting disk 307*b* are disposed at an at least one position in the width direction. In an example of a graphically illustrated configuration, two pairs of the cutter blade 307*a* and the abutting disk 307*b* are disposed at the one side and the other side with respect to a center of the conveyance path in the width direction. Further, each pair of the cutter blade 307*a* and the abutting disk 307*b* are movable in the width direction with a drive unit. Note that, as an alternative, it is acceptable to dispose one or equal to or more than three cutter blade(s), and also acceptable to configure the cutter blade(s) unmovable in the width direction. Further, it is acceptable to configure the top/bottom cutter unit 307 attachable to and detachable from the sheet cutting apparatus B0, and provide a plurality of the top/bottom cutter units 307, which are different in arrangements of blades, for a user or a service personnel to exchange in accordance with a purpose of use.

In FIG. 2, the lateral registration detection sensor 304 disposed upstream of the front/rear cutter unit 305 detects an edge position of the sheet conveyed on the conveyance path 310 in the width direction. In the cutting process with the top/bottom cutter unit 307, the cutting position is determined based on the edge position detected with the lateral registration detection sensor 304. That is, the cutter blade 307*a* and the abutting disk 307*b* move to the cutting position based on the instruction of the cutting amount sent from the control unit of the image forming apparatus A0, described later, and the edge position of the sheet detected with the lateral registration detection sensor 304, and cuts the top/bottom portion of the sheet. The sheet cut with the top/bottom cutter unit 307 is discharged to the sheet processing apparatus C0 with the discharge roller pair 308.

Although an operation of the cutting process of the sheet with the front/rear cutter unit 305 and the top/bottom cutter unit 307 has been described above, in a case where the cutting process of the sheet is not performed, the sheet is delivered to the sheet processing apparatus C0 by conveyed on the conveyance path 310. That is, the conveyance path 310 is not only for the conveyance of the sheet to be performed of the cutting process in the cutting portion B1, but also for the conveyance of the sheet not to be performed of the cutting process in the cutting portion B1. A movement to retreat the cutting blades of the front/rear cutter unit 305 and the top/bottom cutter unit 307 from a passing area of the sheet will be described later.

Incidentally, as a result of the cutting process with the front/rear cutter unit 305 and the top/bottom cutter unit 307, sheet pieces which constitute a product and a fragment which does not constitute the product (sheet chip) are produced from the sheet which the sheet cutting apparatus B0 has received from the image forming apparatus A1. This sheet chip is collected by dropped into a chip storage box 319, which is a collection container disposed below the cutting portion B1. In this embodiment, since the front/rear cutter unit 305 and the top/bottom cutter unit 307 are approximately horizontally disposed in adjoining each other, it is possible to use the chip storage box 319 in common use for the two cutter units.

To be noted, in the image forming system 100 of this embodiment shown in FIG. 1, all of the sheet discharged from the sheet cutting apparatus B0 is delivered to the sheet processing apparatus C0 regardless of whether or not a further postprocessing is performed. However, it is possible to provide the sheet cutting apparatus B0 with a discharge tray, and stack the sheet discharged from the sheet discharge port 313 on the aforementioned discharge tray as the product of the image forming system.

3. Sheet Processing Apparatus

Figure 5:
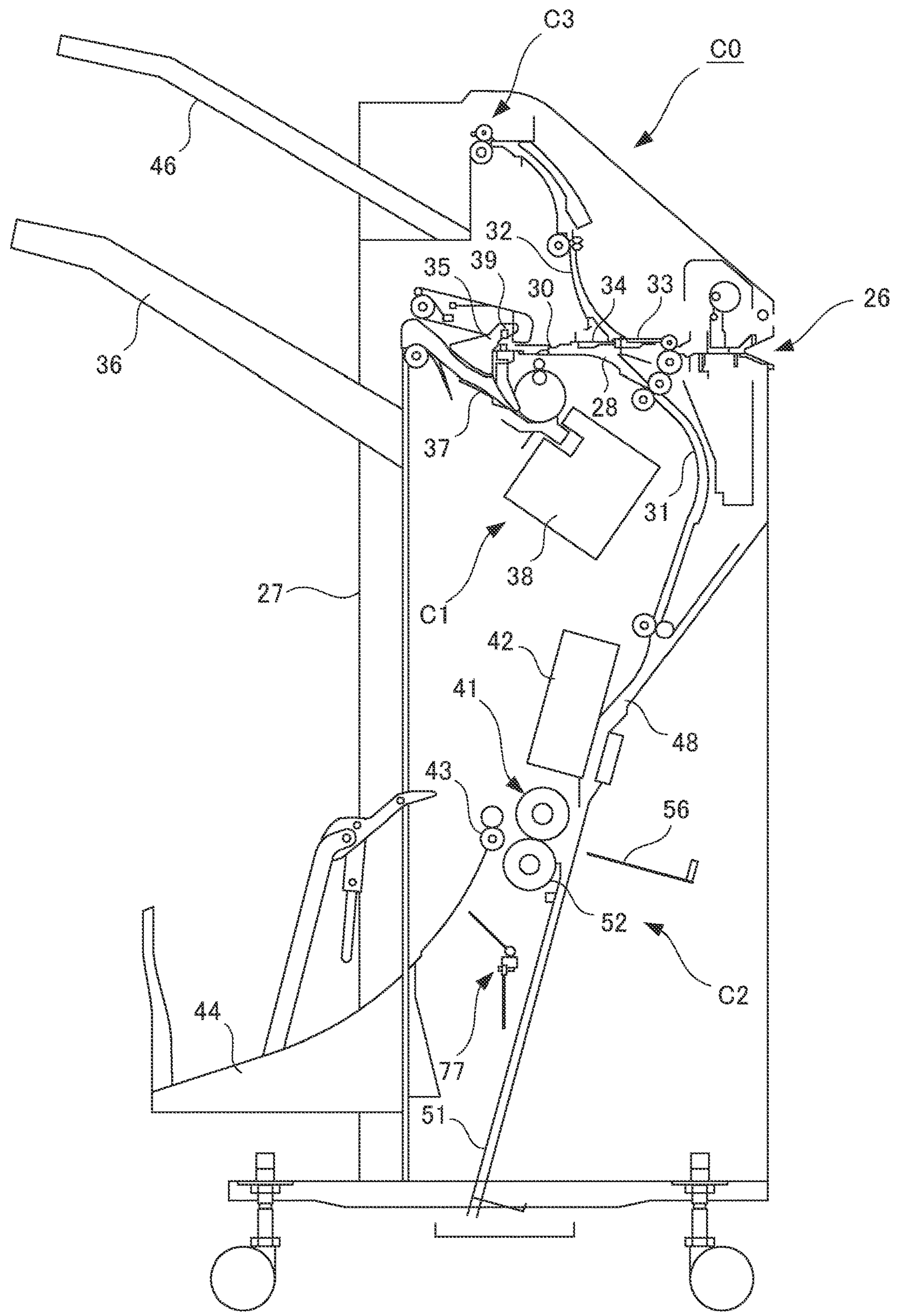
FIG. 5 is a configuration diagram showing a sheet processing apparatus according to the first embodiment.

Next, a configuration and operation of the sheet processing apparatus C0 will be described. FIG. 5 shows the configuration of the sheet processing apparatus C0 which performs the postprocessing of the sheet sent from the sheet cutting apparatus B0. The sheet processing apparatus C0 includes an apparatus housing 27 provided with a sheet inlet port 26 to import the sheet from the sheet cutting apparatus B0. The apparatus housing 27 is disposed by positioning the sheet inlet port 26 to communicate with the sheet discharge port of the sheet cutting apparatus B0.

The sheet processing apparatus C0 includes a sheet import path 28 to convey the sheet imported from the sheet inlet port 26, a first, a second, and a third sheet discharge path 30, 31, and 32 branched from the sheet import path 28, a first and a second path switching member 33 and 34. The first and the second path switching member 33 and 34 are each configured with a flap-shaped guide to switch the conveyance direction of the sheet conveyed on the sheet import path 28.

The first path switching member 33 is able to switch modes with a drive unit, not shown, between a mode to guide the sheet from the sheet inlet port 26 to the first and the second sheet discharge path 30 and 31, and a mode to guide the sheet from the sheet inlet port 26 to the third sheet discharge path 32. The first and the second sheet discharge path 30 and 31 communicate with each other so that it is possible to reverse the conveyance direction of the sheet once imported to the first sheet discharge path 30 and convey the sheet to the second sheet discharge path 31 in a switch-back conveyance manner.

The second path switching member 34 is disposed downstream of the first path switching member 33 in the conveyance direction of the sheet conveyed on the sheet import path 28. The second path switching member 34 is able to switch modes with a drive unit, not shown, between a mode to deliver the sheet passed through the first path switching member 33 to the first sheet discharge path 30 and a mode to convey the sheet once delivered to the first sheet discharge path 30 to the second sheet discharge path 31 in the switchback conveyance manner.

The sheet processing apparatus C0 includes a first processing unit C1, a second processing unit C2, and a third processing unit C3, which are different each other in the postprocessing performed in each unit.

The first processing unit C1 is a binding process unit, which, with respect to the conveyance direction of the sheet conveyed on the sheet import path 28, accumulates a plurality of sheets discharged from a discharge port 35 disposed at a downstream edge of the first sheet discharge path 30, aligns a sheet bundle in a unit, and performs a binding process. The sheet bundle processed in the first processing unit C1 is discharged to a stacker tray 36 disposed outside the apparatus housing 27. The first processing unit C1 includes a sheet conveyance unit 37 to convey the sheet or the sheet bundle, a binding process unit 38 to perform the binding process of the sheet bundle. At the downstream edge of the first sheet discharge path 30, a sheet discharge roller pair 39 is disposed to discharge the sheet from the discharge port 35 and to convey the sheet from the first sheet discharge path 30 to the second sheet discharge path 31 in the switchback conveyance manner.

The second processing unit C2 makes the sheet bundle of the plurality of the sheets conveyed from the second sheet discharge path 31 in the switchback conveyance manner, performs the binding process of the sheet bundle, and thereafter performs a folding process. The second processing unit C2 includes a folding process unit 41 to fold an imported sheet or sheet bundle, and a binding process unit 42 disposed immediately upstream of the folding process unit mentioned above along the sheet conveyance direction on the second sheet discharge path 31 to perform the binding process of the sheet bundle. The sheet bundle processed through the folding process is discharged to a stacker tray 44, disposed outside the apparatus housing 27, with a discharge roller pair 43.

The third processing unit C3 performs a jog assortment to sort the sheet delivered from the third sheet discharge path 32 into a group to accumulate after offsetting a predetermined amount in a direction perpendicularly intersecting with the conveyance direction and a group to accumulate without offsetting. The sheet assorted by the jog assortment is discharged to a stacker tray 46, disposed outside the apparatus housing 27, and both of the sheet bundle accumulated with and without offsetting are piled.

Figure 6:
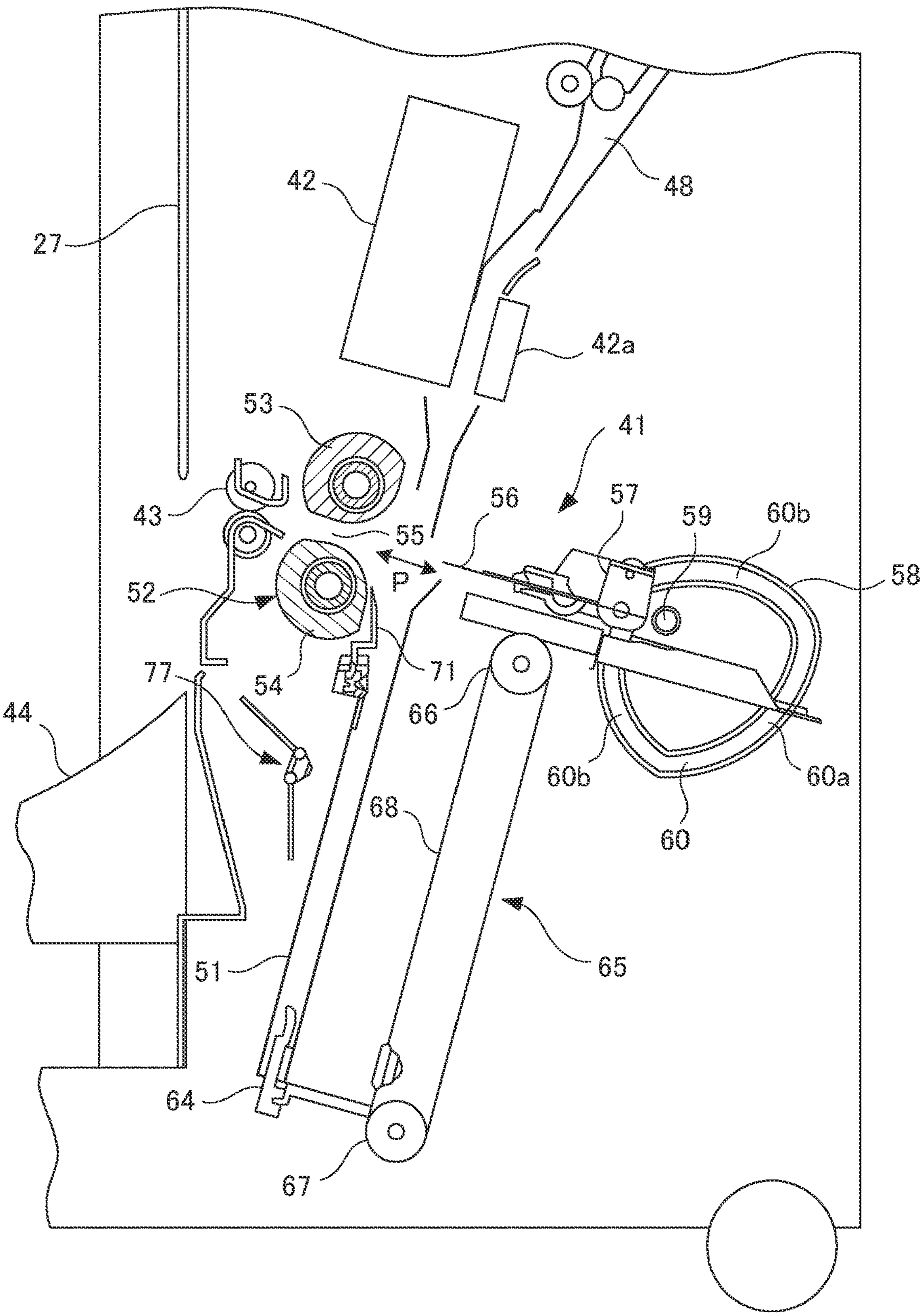
FIG. 6 is a configuration diagram showing a second processing unit of the sheet processing apparatus according to the first embodiment.

FIG. 6 schematically shows a general configuration of the second processing unit C2. As described above, the second processing unit C2 includes the folding process unit 41 to fold the sheet accumulated and aligned in a unit of the sheet bundle after imported from the second sheet discharge path 31 into a two-folded form, and the binding process unit 42 to perform the binding process of the sheet bundle prior to the folding process. The binding process unit 42 illustrated in the figure is a staple device to bind the sheet bundle by driving a staple needle thereinto.

A conveyance path 48 is coupled to the second sheet discharge path 31 to import the sheet in the folding process unit 41. With respect to the conveyance direction of the sheet conveyed from the second sheet discharge path 31 to a stacker tray 51, the sheet stacker tray 51 constituting a part of the conveyance path of the sheet is disposed downstream of the conveyance path 48 to stack the sheet with positioning the sheet for the folding process. The sheet stacker tray 51 forms a process tray to store the sheet conveyed with a conveyance unit constituting with rollers disposed at the second sheet discharge path 31. Then, immediately upstream of the sheet stacker tray 51, the binding process unit 42 and a needle support portion 42*a* are disposed to face each other across the sheet conveyance path 48.

A folding roller pair 52 is disposed on one of sides of the sheet stacker tray 51 to face one of surfaces of the sheet or the sheet bundle which is to be stacked on the sheet stacker tray 51. The folding roller pair 52 includes folding rollers 53 and 54 whose roller surfaces make a pressure contact each other, and the folding rollers 53 and 54 are disposed such that a pressure contact portion 55 faces the sheet stacker tray 51. The folding rollers 53 and 54 are disposed in parallel each other with an approximately same distance from the sheet stacker tray 51 at an upstream and a downstream position along the conveyance direction of the sheet imported to the sheet stacker tray 51. The folding rollers 53 and 54 nip a two-folded sheet, and form a folding line in a direction intersecting with the conveyance direction of the sheet conveyed from the second sheet discharge path 31 to the sheet stacker tray 51. To be noted, the sheet is accumulated due to an accumulation of a succeeding sheet on a side of the folding rollers 53 and 54.

At an opposite side of the folding roller pair 52 across the sheet stacker tray 51, a folding blade 56 is disposed as a projection member. The folding blade 56 directs a front edge thereof to the pressure contact portion 55 of the folding roller pair 52, and is carried with a blade carrier 57. The blade carrier 57 is disposed movably in a direction approximately perpendicularly crossing the sheet stacker tray 51, that is, in a direction intersecting with the conveyance direction of the sheet conveyed from the second sheet discharge path 31 to the sheet stacker tray 51.

In a direction from a front to rear surface of FIG. 6, that is, in an axis direction of the folding roller pair 52, a pair of cam members 58 of a pair of eccentric cams in mirror symmetry each other (only the rear side of the pair of the cam members 58 is shown in the figure) are disposed to face each other across the blade carrier 57. The pair of the cam members 58 are drivingly rotated with a drive unit such as a drive motor, not shown, around a rotation shaft 59 disposed at an eccentric position as a center. A cam groove 60 is formed on the pair of the cam members 58 along an edge of circumference thereof.

The cam groove 60 has a cam profile in which a first cam surface 60*a* has a maximum radius from the rotation shaft 59 and a second cam surfaces 60*b* has a smaller radius in comparison with the first cam surface 60*a* on both sides in a circumferential direction. The blade carrier 57 is provided with a cam pin, not shown, which, as a cam follower, slidably engages with the cam groove 60.

When the pair of the cam members 58 are rotated with a drive motor, the blade carrier 57 moves in a direction to approach to and retreat from the sheet stacker tray 51 in accordance with the cam profile. Herewith, as shown in FIG. 6, it is possible to move linearly the folding blade 56 freely between an initial position and a maximally projected position along a projection path P connecting the both positions. Note that the initial position is a position where the front edge of the folding blade 56 does not enter into the conveyance path 48, and the maximally projected position is a position where the front edge of the folding blade 56 is nipped with the pressure contact portion 55 of the folding roller pair 52. Then, by the sheet being projected into the pressure contact portion 55 with the folding blade 56, the sheet is folded. Accordingly, the folding roller pair 52 and the folding blade 56 compose a folding unit.

A regulation stopper 64 is disposed at a lower edge of the sheet stacker tray 51 to regulate a front edge of the imported sheet by abutting thereon. The regulation stopper 64 works as a regulation member which abuts on an edge of the sheet placed on the sheet stacker tray 51, which is a placement member, in the conveyance direction of the sheet and regulate the sheet to hold at a placed position. Further, this regulation stopper 64 is disposed in an ascendable and descendable manner along the sheet stacker tray 51 with a sheet lifting mechanism 65.

The sheet lifting mechanism 65 is a conveyor belt mechanism including a pair of pulleys 66 and 67, disposed at a back of the sheet stacker tray 51 along the sheet stacker tray 51 and in adjacencies of an upper and lower end thereof, and a transmission belt 68, wound around the pair of the pulleys 66 and 67. The regulation stopper 64 is fixed on the transmission belt 68. By drivingly rotating a driving pulley, one of the pair of the pulleys 66 and 67, with a drive unit such as a drive motor, the regulation stopper 64 ascends and descends between a lower edge shown in FIG. 6 and a desired height, and therefore it is possible to move the sheet or the sheet bundle along the sheet stacker tray 51.

The sheet lifting mechanism 65 transports the sheet or the sheet bundle from a placement position supported with the regulation stopper 64 to a position for the folding process. In a case where a length dimension in the conveyance direction of the sheet exceeds a predetermined value, the sheet lifting mechanism 65 transports the sheet or the sheet bundle to the position for the folding process by ascending the regulation stopper 64, but in a case where the length dimension in the conveyance direction of the sheet is equal to or smaller than the predetermined value, the sheet lifting mechanism 65 transports the sheet or the sheet bundle by descending the regulation stopper 64. The sheet lifting mechanism 65 composes a transportation mechanism to transport the sheet or the sheet bundle to the position for the folding process.

The folding process unit 41 includes a paddle wheel 77. This paddle wheel 77 works as a positioning mechanism to adjust a position of the sheet carried in the sheet stacker tray 51 in the conveyance direction by transporting the aforementioned sheet to the regulation stopper 64, and is driven with a drive unit such as a motor, not shown.

Figure 7:
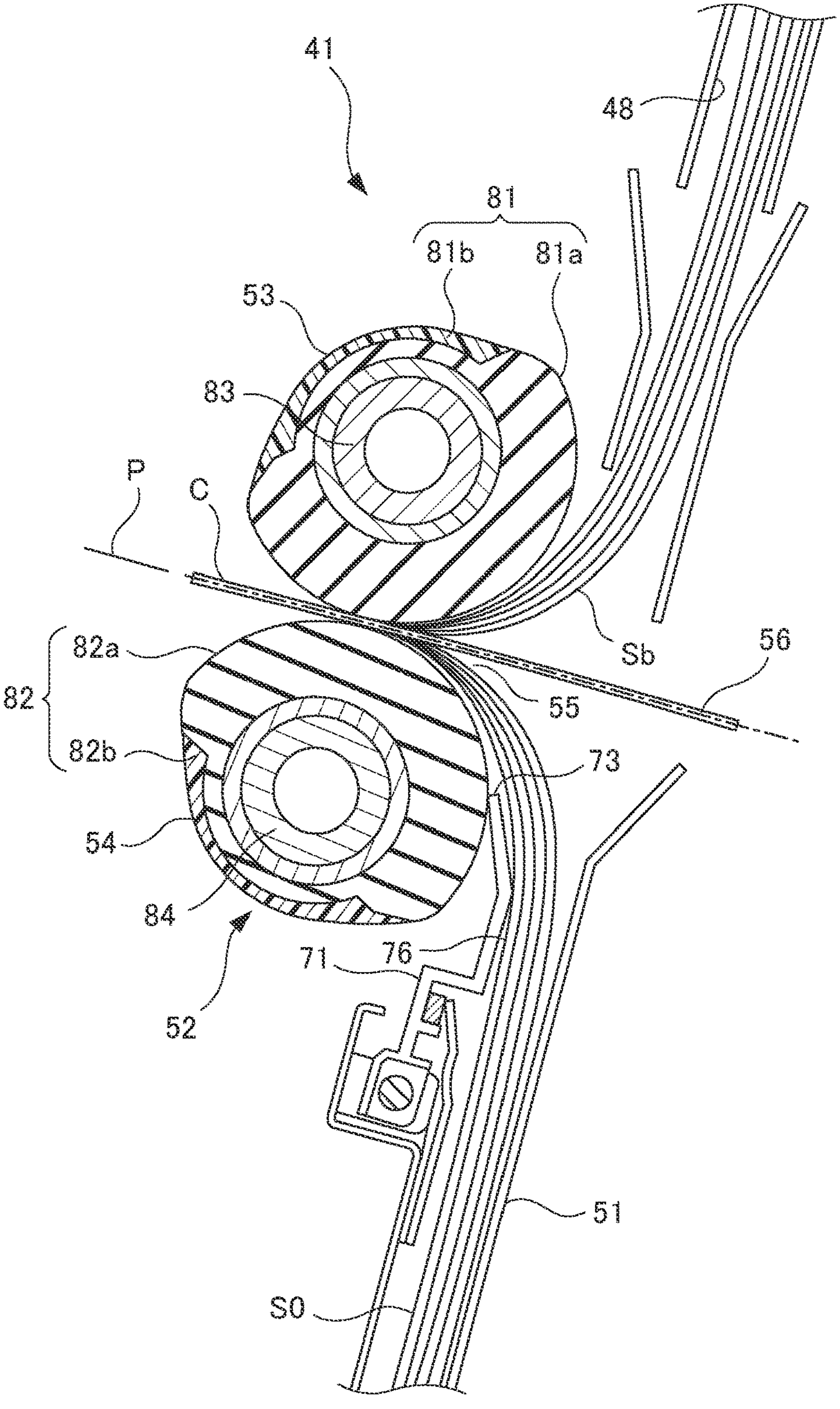
FIG. 7 is a diagram showing a folding operation performed in the second processing unit according to the first embodiment.

FIG. 7 shows a state where the sheet bundle Sb in the sheet stacker tray 51 is folded into the two-fold form with the folding blade 56 and is projected into the pressure contact portion 55 of the folding roller pair 52. At this time, a most external sheet S0 of the sheet bundle Sb, that is, a sheet on a side of the folding roller pair 52 is sent into the pressure contact portion 55 guided with an inclined surface 76 of a guide member 71.

Rotation shafts 83 and 84 of the folding rollers 53 and 54, respectively, are drivingly rotated with a common drive unit such as a drive motor. Therefore, it is possible to always synchronize rotation positions of first roller surfaces 81*a* with 82*a* and second roller surfaces 81*b* with 82*b* each other. It is also possible to drive the rotation shafts 83 and 84 with a common drive motor with the pair of the cam members 58.

Figure 8:
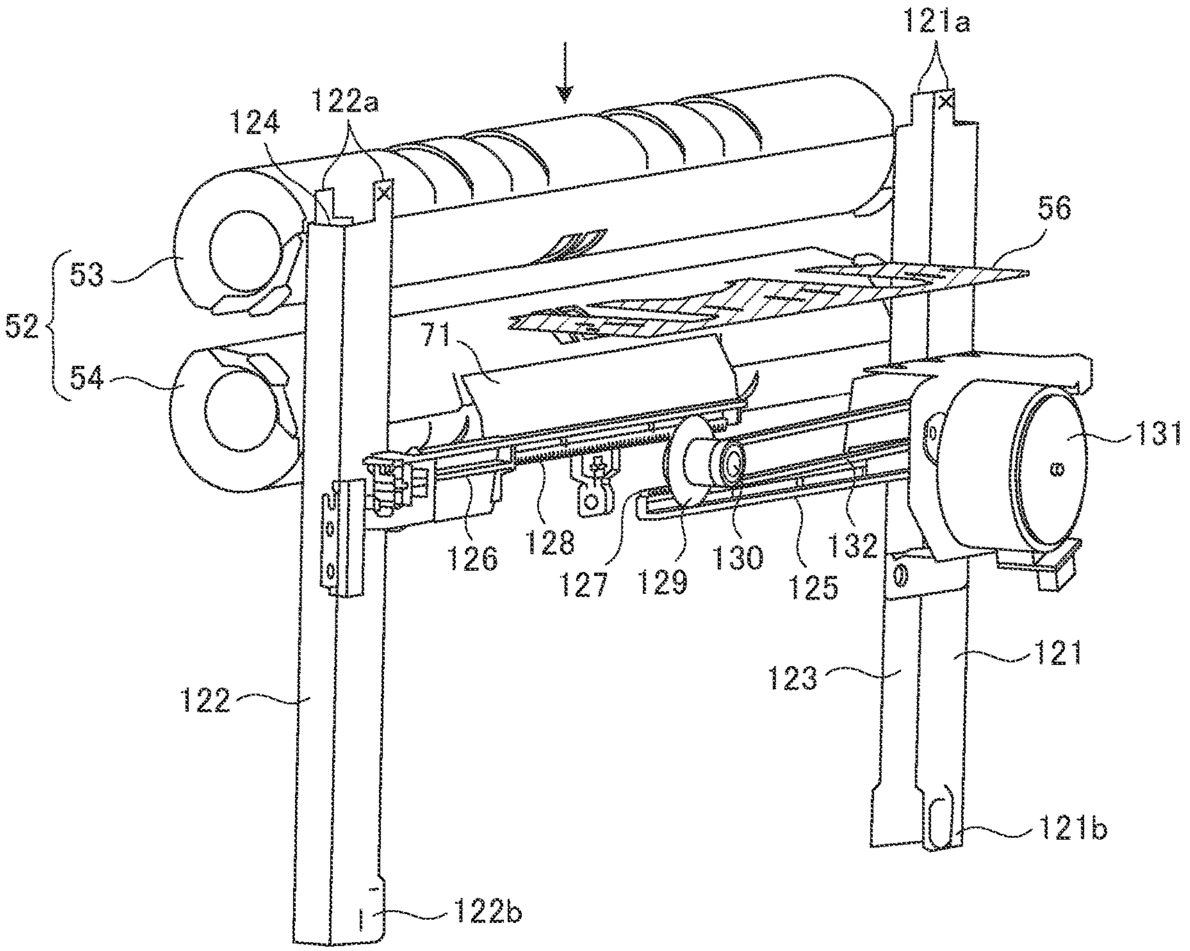
FIG. 8 is a configuration diagram showing a positioning mechanism of the second processing unit according to the first embodiment.

The positioning mechanism includes, as shown in FIG. 8, a pair of sheet side edge alignment members 121 and 122 which are separately disposed symmetrically each other in a direction perpendicularly intersecting with the conveyance direction of the sheet shown in an arrow direction in the figure. Upper edges 121*a* and 122*a* and lower edges 121*b* and 122*b* of the pair of the sheet side edge alignment members 121 and 122 are movably held with a guide member fixed on a side of the apparatus housing 27 so that the pair of the sheet side edge alignment members 121 and 122 are capable of approaching to and retreating from each other in the direction perpendicularly intersecting with the conveyance direction of the sheet.

The pair of the sheet side edge alignment members 121 and 122 are configured with frame members of a rectangular shape with one side open extending along an importing direction of the sheet, and disposed in parallel by facing opening portions of the rectangular shape with one side open each other. Inside surfaces of the rectangular shape with one side open of the pair of the sheet side edge alignment members 121 and 122 define sheet side edge regulation surfaces 123 and 124 which regulate side edges of the sheet in the sheet stacker tray 51 by aligning along the direction perpendicularly intersecting with the import direction of the sheet, that is, along the width direction. In particular, the sheet side edge regulation surfaces 123 and 124 having a cross sectional shape of the rectangular shape with one side open are capable of regulating the side edges of the sheet in the sheet stacker tray 51 not only in the width direction of the sheet but also in a thickness direction of the sheet, that is, the thickness direction of the sheet stacker tray 51 (the sheet conveyance path 48). To be noted, although both of the pair of the sheet side edge alignment members 121 and 122 are movable in this embodiment, it is possible to perform positioning along the side edge of the sheet by configuring only one of the pair of the sheet side edge alignment members 121 and 122 movable.

The pair of the sheet side edge alignment members 121 and 122 are provided with guide rail members 125 and 126, respectively, in adjacencies of a center in a longitudinal direction thereof on an outer surface side facing the folding blade 56. Each of the guide rail members 125 and 126 linearly extends to another sheet side edge alignment member each other, and is integrally fixed to the respective pair of the sheet side edge alignment members 121 and 122. The guide rail members 125 and 126 are disposed with a predetermined space in the conveyance direction of the sheet, in parallel in a vertical direction in the figure, and overlapping front end portions thereof at least partially each other.

On side edges of the guide rail members 125 and 126, which are facing each other vertically, racks 127 and 128 are formed, respectively, so that the sheet side edge alignment members 121 and 122 maintain a predetermined space in the import direction of the sheet at a time of approaching to and receding from each other. At the same time, a pinion 129, whose shaft is supported in a freely pivotable manner with the apparatus housing 27, is engaged with the racks 127 and 128.

A pulley 130 serving as a driven pulley is coaxially coupled to the pinion 129 on the side of the folding blade 56 in an integrally pivotable manner. A transmission belt 132 is wound around the pulley 130 and a drive pully, not shown, coupled to an output shaft of a motor 131, which is fixed to the apparatus housing 27 and drives the pair of the sheet side edge alignment members, so that it is possible to transmit a power from the drive pulley to the pulley 130.

Therefore, the pair of the sheet side edge alignment members 121 and 122 move a same distance to approach to and retreat from each other in the width direction of the sheet in a synchronized manner by driving the motor 131 and rotating the pinion 129. Herewith, in a case where a position of the sheet in the sheet stacker tray 51 is misaligned in the width direction thereof, it is possible to move a side edge of the aforementioned sheet to a desired aligned position by abutting the side edges on one of the pair of the sheet side edge regulation surfaces 123 or 124.

4. Control of Image Forming System

Figure 9:
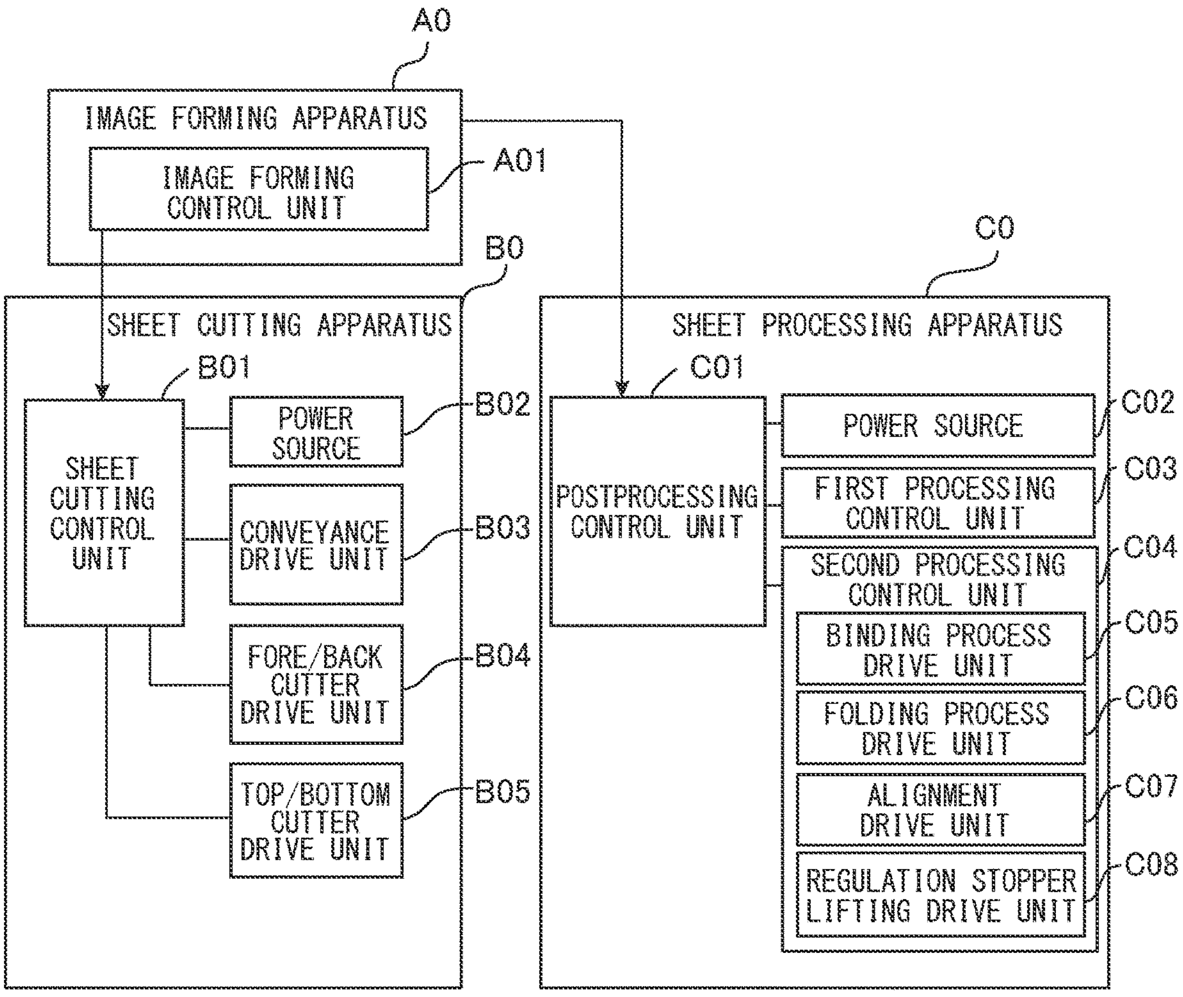
FIG. 9 is a block diagram showing a control configuration of the image forming system according to the first embodiment.

Next, a control configuration and a flow of an operation of the image forming system 100 will be described. FIG. 9 shows a control block diagram of the image forming apparatus A0, the sheet cutting apparatus B0, and the sheet processing apparatus C0. The image forming apparatus A0, the sheet cutting apparatus B0, and the sheet processing apparatus C0 respectively include an image forming control unit A01, a sheet cutting control unit B01, and a postprocessing control unit C01 to control the operation of each apparatus.

These control units (A01, B01, C01) for the respective apparatuses are electrically coupled and communicable to each other, and control the image forming system in cooperation. That is, the image forming control unit A01, the sheet cutting control unit B01, and the postprocessing control unit C01, which are coordinating each other, work as a controller to control the operation of the image forming system 100 including the sheet cutting apparatus B0. The image forming control unit A01 is a first control unit of this embodiment which sends the instruction regarding the cutting process, such as the cutting amount, to the sheet cutting control unit B01, which is a second control unit. The sheet cutting control unit B01 is the second control unit of this embodiment, which controls the operation of the sheet cutting apparatus based on the instruction sent from the image forming control unit A01.

The image forming control unit A01 includes a processing unit as an execution unit to execute a program and a memory as a storage unit to store information. The processing unit runs the program by reading out the program stored in the memory, and controls each part of the image forming unit A1. The memory includes a nonvolatile storage medium, such as a read only memory and a magnetic disk, and a volatile storage medium, such as a random access memory, works as a storage space of the program and data, and also works as a workspace for the processing unit to run the program. The abovementioned memory is an example of a non-transitory medium storing the program to control the image forming apparatus.

Each of the sheet cutting control unit B01 and the postprocessing control unit C01 includes a processing unit as an execution unit to run a program and a memory as a storage unit to store information.

The sheet cutting control unit B01 sends a command signal to a power source B02, a conveyance drive unit B03, a front/rear cutter drive unit B04, and a top/bottom cutter drive unit B05, and controls an operation of each unit. The power source B02 supplies an electric power to move the conveyance drive unit B03, the front/rear cutter drive unit B04 and the top/bottom cutter drive unit B05. The conveyance drive unit B03 includes a drive motor and a drive circuit thereof to drive conveyance rollers disposed in the sheet cutting apparatus B0 (such as the inlet roller pair 302, and the registration roller pair 303). The front/rear cutter drive unit B04 includes a drive motor and a drive circuit thereof to vertically move the guillotine blade 305*a* of the front/rear cutter unit 305. The top/bottom cutter drive unit B05 includes a drive motor and a drive circuit thereof to drivingly rotate and move in the width direction the cutter blade of the top/bottom cutter unit 307.

The postprocessing control unit C01 sends a command signal to a power source C02, a first processing control unit C03, and a second processing control unit C04, and controls an operation of each unit. The power source C02 supplies an electric power to move the first processing control unit C03 and the second processing control unit C04. The first processing control unit C03 includes equal to or more than one drive motor(s) and drive circuit(s) thereof to move the first processing unit C1. The second processing control unit C04 includes a plurality of drive units to move the second processing unit C2. Among the second processing control unit C04, a binding drive unit C05 includes a drive motor and a drive circuit thereof to drive the binding process unit 42. A folding drive unit C06 includes a drive motor and a drive circuit thereof to drive the pair of the cam members 58, which moves the folding blade 56, and the folding roller pair 52. An alignment drive unit C07 includes the motor 131 described above and a drive circuit thereof for an alignment of the side edge of the sheet. A regulation stopper lifting drive unit C08 includes a drive motor and a drive circuit thereof to drive the sheet lifting mechanism.

Further, the sheet cutting control unit B01 and the postprocessing control unit C01 change a detail and a timing of processing of the sheet delivered from the image forming apparatus A0 based on information sent from the image forming control unit A01. The information sent from the image forming control unit A01 includes information regarding the sheet used in a job under execution, such as a size, a grammage, a sheet type, number of sheets, and a cutting amount for each sheet. The image forming control unit A01 also sends information, which is required for the sheet cutting apparatus B0 and the sheet processing apparatus C0 to determine the timing of the operation thereof, such as a time to start executing a job, an estimated time of discharge of each sheet from the image forming apparatus A0, and a signal indicating interruption of a job.

Figure 10:
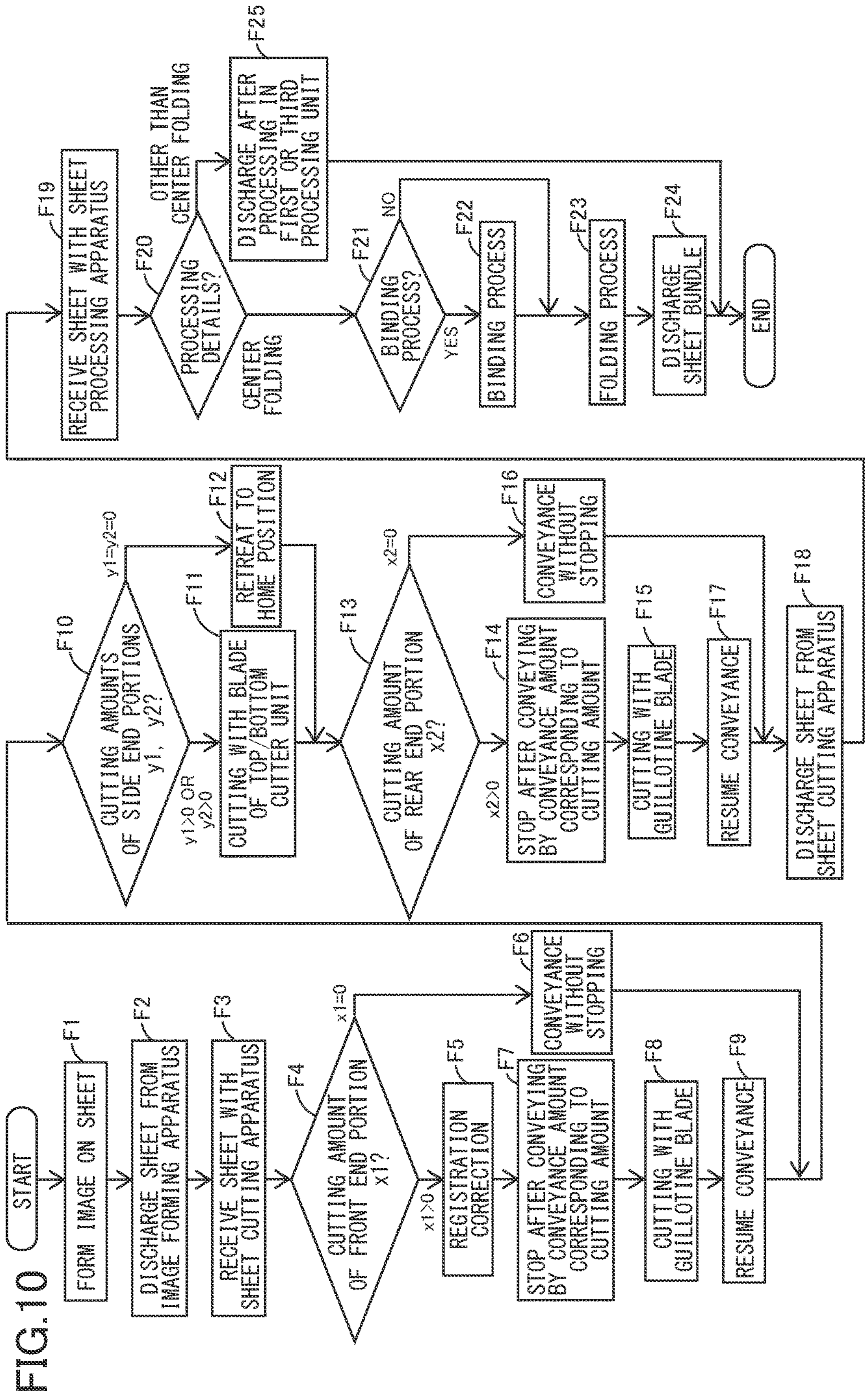
FIG. 10 is a flowchart showing a flow of an operation of the image forming system according to the first embodiment.

FIG. 10 shows the flow of the operation performed in the image forming system 100. A sequence of the operation to successively perform the image formation on a plurality of the sheet and discharge in a form of the sheet bundle, after performing a cutting and folding process, will be described below.

First, the image forming apparatus A0 starts the operation of the image formation by feeding the sheet which is used as the recording material (step F1), and discharge the sheet from the discharge port of the image forming unit A1 (step F2). The sheet cutting apparatus B0 receives the sheet discharged from the image forming apparatus A0, one sheet at a time, and conveys the sheet via the conveyance path 310 (step F3).

Hereafter, the operation of the sheet cutting apparatus B0 (the steps from F4 to F18) becomes different depending on the cutting amount instructed to the sheet cutting control unit B01 from the image forming control unit A01.

In a case where the cutting amount of the front end portion of the sheet (i.e., the downstream cutting amount in the conveyance direction among the sub-scanning directions) is not zero (step F4), the cutting process to cut the front end portion of the sheet in the conveyance direction is performed with the front/rear cutter unit 305. In this case, after the registration correction has been performed with the registration roller pair 303 shown in FIG. 2 (step F5), the sheet is stopped after conveyed with the registration roller pair 303 by as much as a feeding amount corresponding to the cutting amount (step F7). Then, by cutting the sheet with the guillotine blade 305*a* in the width direction, the rear end portion of the sheet is cut at a position corresponding to the instructed cutting amount (step F8). When the cutting process of the sheet ends, the conveyance of the sheet is resumed again (step F9).

On the other hand, in a case where the cutting amount of the front end portion of the sheet is set at zero (step F4), that is, in a case where it is instructed not to perform the cutting process of the front end portion of the sheet, the registration correction with the registration roller pair 303 is not performed, and the sheet is conveyed to the top/bottom cutter unit 307 without stopping (step F6).

After processing of the steps from F4 to F9 regarding the cutting process of the front end portion of the sheet, the cutting process is performed with the top/bottom cutter unit 307 depending on the cutting amount of the top/bottom portion of the sheet (the cutting amount in the primary-scanning direction). In a case where the cutting amount of the top/bottom portion of the sheet is not zero (step F10), the sheet is passed through the top/bottom cutter unit 307 with the cutter blade 307*a* shown in FIG. 4 entering into inside edge positions of the sheet by such an amount that corresponds to the cutting amount (step F11). Herewith, the sheet is cut at a position corresponding to the instructed cutting amount along the conveyance direction.

On the other hand, in a case where the cutting amount of the top/bottom portion of the sheet is set at zero (step F10), that is, in a case where it is instructed not to perform the cutting process of the top/bottom portion of the sheet, the sheet is conveyed with the cutter blade 307*a*, shown in FIG. 4, retreated to a home position (step F12). This home position is a position set outside the sheet passing area in the width direction, where the cutter blade 307*a* does not contact with the sheet passing through the conveyance path 310.

After the processing of the steps from F10 to F11 regarding the cutting process of the top/bottom portion of the sheet, the cutting process of the rear end portion of the sheet is performed. In a case where the cutting amount of the rear end portion of the sheet (the upstream cutting amount in the conveyance direction among the sub-scanning directions) is not zero (step F13), the cutting process of the rear end portion of the sheet is performed with the front/rear cutter unit 305. In this case, the sheet is stopped after conveyed the sheet by as much as a feeding amount corresponding to the cutting amount (step F14). Then, by cutting the sheet in the width direction with the guillotine blade 305*a*, the cutting process of the rear end portion of the sheet is performed at a position corresponding to the instructed cutting amount (step F15). When the cutting process of the sheet ends, the conveyance of the sheet is resumed again (step F17).

On the other hand, in a case where the cutting amount of the rear end portion of the sheet is set at zero (step F13), that is, in a case where it is instructed not to perform the cutting process of the rear edge of the sheet, the sheet is conveyed to the top/bottom cutter unit 307 without stopping (step F16).

After the cutting process in the sheet cutting apparatus B0 has ended, the sheet is discharged from the sheet cutting apparatus B0 (step F18), and received with the sheet processing apparatus C0 (step F19). In a case where a two-fold folding process is performed (step F20), the sheet is conveyed to the second processing unit C2 inside the sheet processing apparatus C0, and stacked on the sheet stacker tray 51 of the second processing unit C2. To be noted, the processing of the steps from F1 to F20 described above is performed in parallel with respect to a predetermined number of sheets constituting one unit of the product, and when the last sheet of the predetermined number of the sheets is stacked on the sheet stacker tray 51, the binding process and the folding process with the second processing unit C2 are performed.

In a case where both of the binding process and the folding process are performed (step F21), that is, in a case of a saddle stitching binding, the binding process unit 42 binds the sheet bundle (step F22), the sheet bundle in the folded form (step F23) is discharged (step F24) with the folding blade 56 and the folding roller pair 52. In a case where the binding process is not performed but the folding process is performed, the sheet bundle in the folded form (step F23) is discharged (step F24) with the folding blade 56 and the folding roller pair 52.

On the other hand, in a case where it is instructed to process the sheet in another processing unit than the second processing unit C2, the sheet processing apparatus C0 conveys the sheet received from the sheet cutting apparatus B0 to an appropriate processing unit, and the sheet or the sheet bundle is discharged after the processing (step F25). For example, in a case of a job to output a single piece of the sheet without folding processing as the product, such as a poster, the sheet cut through the cutting process in the sheet cutting apparatus B0 is discharged to the stacker tray 46 (FIG. 1) of the sheet processing apparatus C0, one sheet at a time. Note that it is acceptable to discharge the product of the single piece of the sheet without folding processing to another stacker tray (for example, a stacker tray fixed to the sheet cutting apparatus B0) depending on a system configuration of the image forming system.

In the flow of the operation described above, an operation in a case where the sheet cutting apparatus B0 does not perform the cutting process of the sheet will be described in detail.

When the front edge of the sheet delivered from the image forming apparatus A0 to the sheet cutting apparatus B0 arrives at the front/rear cutter unit 305, the conveyance of the sheet is not stopped, and the sheet passes through the front/rear cutter unit 305 without processing (step F6). At this time, the guillotine blade 305*a* in FIG. 3 has been retreated to a waiting position above the conveyance path 310 in advance. To be noted, although the waiting position is disposed above the conveyance path 310 in an example of a configuration shown in FIG. 3, it is acceptable to retreat the guillotine blade 305*a*, for example, below the conveyance path 310 if the guillotine blade 305*a* does not contact with the sheet at such a position.

Next, when the front edge of the sheet arrives at the top/bottom cutter unit 307, the cutter blade 307*a* and the abutting disk 307*b* in FIG. 4 have been retreated to the home position in advance (step F12) based on size information sent from the image forming control unit A01 to the sheet cutting control unit B01. That is, each pair of the cutter blade 307*a* and the abutting disk 307*b* have been moved to a position which is outside the both edge positions of the sheet in the width direction with a predetermined margin added to an informed sheet width.

Thereafter, when the rear edge of the sheet arrives at the front/rear cutter unit 305, the sheet is not stopped and passes through the front/rear cutter unit 305 without processing (step F16). At this time, the guillotine blade 305*a* shown in FIG. 3 has been retreated in advance to a position where the guillotine blade 305*a* does not contact with the sheet.

Thus, in this embodiment, two cutting units (305 and 307) are disposed at the conveyance path 310 of sheet cutting apparatus B0 to cut the sheet in the conveyance direction and in the width direction of the sheet, and are configured to be retreated from the sheet passing area in a case where the cutting process of the sheet is not performed. Herewith, a versatile image forming system, which is simple in a configuration and capable of cutting the sheet one sheet at a time at an arbitrary position is attained.

To be noted, in the flow of the operation shown in FIG. 10, it is described that the sheet cutting apparatus B0 is capable of performing the cutting process of trimming to remove cutting margins at four sides of the sheet. However, the sheet cutting apparatus B0 of this embodiment is capable of cutting at an arbitrary position and in an arbitrary direction of the sheet conveyed one sheet at a time. Therefore, for example, having performed a layout printing of a name card on a base paper in the image forming apparatus A0, it is possible to obtain the name card of a size conforming to a specification by cutting the base paper with the sheet cutting apparatus B0 and dividing the base paper in terms of the conveyance direction and the width direction. Further, it is possible to perform the processing by which the image is formed on one piece of the sheet in the image forming apparatus A0, the sheet having been formed the image thereon is divided into equal to or more than 2 sheets in the sheet cutting apparatus B0, and a sheet bundled is formed by bundling the aforementioned divided sheets in the sheet processing apparatus C0.

Second Embodiment

A second embodiment is an embodiment in which control details in a case of not performing the cutting process with the top/bottom cutter unit 307 are different from the control details in the first embodiment. Description of overlapping elements with the first embodiment is omitted herein.

Figure 11:
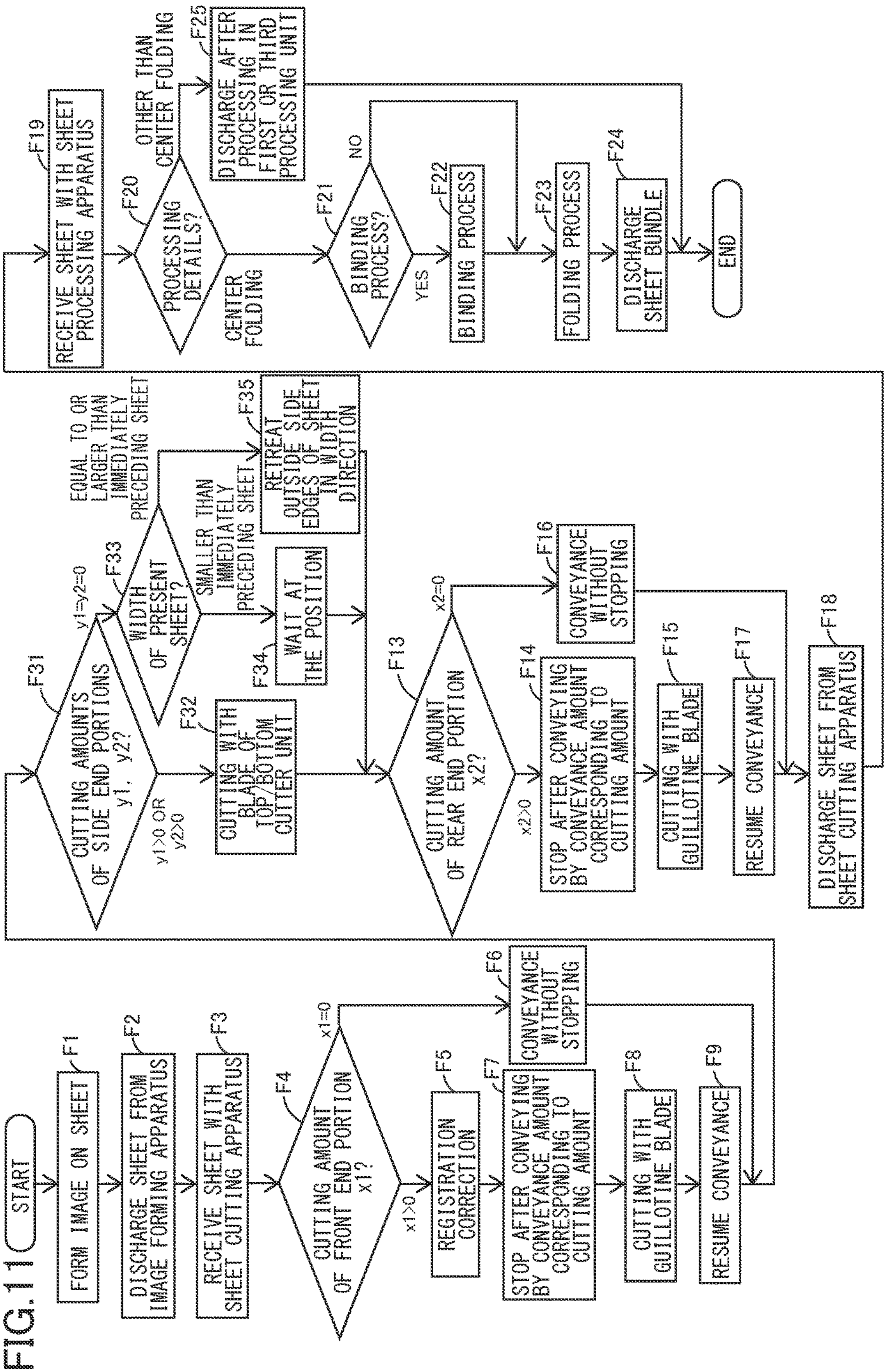
FIG. 11 is a flowchart showing a flow of an operation of the image forming system according to a second embodiment.

FIG. 11 is a flow chart showing a flow of an operation in the image forming system 100. Processing details of the steps from F1 to F9 and the steps from F13 to F24 regarding the operation of the image forming apparatus A0, the sheet processing apparatus C0, and the front/rear cutter unit 305 of the sheet cutting apparatus B0 are similar to the processing details of each step in the first embodiment described using FIG. 10.

After the processing of the steps from F4 to F9 regarding the cutting process of the front end portion of the sheet, the cutting process is performed with the top/bottom cutter unit 307 corresponding to the cutting amount of the top/bottom portion of the sheet (the cutting amount in the primary scanning direction). In a case where the cutting amount of the top/bottom portion of the sheet is not zero (step F31), the sheet is passed through the top/bottom cutter unit 307 with the cutter blade 307*a* shown in FIG. 4 entered into inside the both edge positions of the sheet by an amount which corresponds to the cutting amount (step F32). Herewith, the cutting process of the sheet is performed at the position corresponding to the cutting amount along the conveyance direction.

On the other hand, in a case where the cutting amount of the top/bottom portion of the sheet is set at zero (step F31), that is, in a case where it is instructed not to perform the cutting process of the top/bottom portion of the sheet, the processing to retreat the cutter blade 307*a* in FIG. 4 to the waiting position which depends on a width of a preceding sheet (the steps from F33 to F35) is performed. That is, in this embodiment, in a case where a second sheet passes through the conveyance path 310 following a first sheet, depending on the width of the first sheet, the waiting position where the cutter blade 307*a* (the second cutting blade) retreats is changed when the second sheet passes through the conveyance path 310.

In particular, in a case where the width of the second sheet is smaller than the width of an immediately preceding sheet, the second sheet is passed through the top/bottom cutter unit 307 (step F34) with the cutter blade 307*a* held at a position where the cutter blade 307*a* was retreated to pass the immediately preceding sheet through the top/bottom cutter unit 307. On the other hand, in a case where the width of the second sheet is equal to or larger than the width of the immediately preceding sheet, the cutter blade 307*a* is retreated outward in the width direction from the position where the cutter blade 307*a* was retreated to pass the immediately preceding sheet through the top/bottom cutter unit 307 to a position which is determined by adding a retreating amount, instructed by the image forming control unit A01, to the width of the second sheet. Then, the second sheet is passed through the top/bottom cutter unit 307 with the cutter blade 307*a* held at the aforementioned new position (step F35). To be noted, the position where the cutter blade 307*a* was retreated to pass the immediately preceding sheet through the top/bottom cutter unit 307 is either a cutting position, where the cutter blade 307*a* performed the cutting process of the immediately preceding sheet, or the waiting position, where the cutter blade 307*a* was also retreated at the cutting process of the immediately preceding sheet.

By the operation described above, it is possible to minimize a moving amount of the cutter blade 307*a* of the top/bottom cutter unit 307, and secure a good productivity.

Alternatives

In the first and the second embodiment described above, the sheet cutting apparatus B0 was described as a so-called floor mount type optional apparatus disposed between the image forming apparatus A0 and the sheet processing apparatus C0 in a horizontal direction. However, for example, in a case where the image forming apparatus A0 is an in-drum delivery type, it is acceptable to dispose the sheet cutting apparatus B0 in an in-drum delivery space of the image forming apparatus A0. In a configuration of the in-drum delivery type, a discharge space is formed between the image forming unit A1 and the image reading apparatus in a vertical direction, and the sheet subjected to the image formation with the image forming unit A1 is discharged to the aforementioned discharge space.

Further, in the embodiments described above, the top/bottom cutter unit 307 to cut the sheet in the conveyance direction is disposed downstream of the front/rear cutter unit 305 on the conveyance path 310 in the conveyance direction of the sheet. Since the top/bottom cutter unit 307 is capable of cutting the sheet while the sheet is being conveyed, this relative disposition is advantageous in enabling to stably cut the sheet which was cut short with the front/rear cutter unit

305. Specifically, by attaching rollers to the rotation shafts 307*c* and 307*d* (FIG. 4) of the top/bottom cutter unit 307 to convey the sheet in a sandwiched manner, it is possible to stably perform the processing of an extremely short sheet such as a name card. However, depending on a purpose of use, it is acceptable to dispose the top/bottom cutter unit 307 upstream of the front/rear cutter unit 305. Further, for example, it is acceptable to dispose a plurality of guillotine blades as the front/rear cutter units and cut the sheet at a plurality of positions in the conveyance direction at a same time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-105713, filed on Jun. 5, 2019, which is hereby incorporated by reference herein in its entirety.

What is claimed is:

1. An image forming system comprising:

an image forming apparatus configured to form an image on a sheet;

a cutting apparatus configured to cut the sheet one by one on which the image has been formed by the image forming apparatus;

a sheet processing apparatus configured to process the sheet received from the cutting apparatus; and a controller, wherein the cutting apparatus includes:

a conveyance path through which the sheet received from the image forming apparatus is conveyed, a roller configured to convey the sheet in the conveyance path in a conveyance direction, the roller being configured to perform a skew correction operation in which a skew of the sheet is corrected before the sheet is cut by the cutting apparatus, and a cutting unit configured to cut the sheet in the conveyance path, such that a downstream end portion of the sheet in the conveyance direction is cut along a width direction perpendicular to the conveyance direction, wherein if the controller performs a job for outputting a product of a single sheet and receives an instruction not to cut the downstream end portion of the sheet by the cutting unit, the controller is configured to cause the roller to convey the sheet toward the sheet processing apparatus without performing the skew correction operation.

2. The image forming system according to claim 1, wherein the cutting unit includes a cutting blade configured to move in a moving direction intersecting with both the conveyance direction and the width direction, and wherein if the controller receives the instruction not to cut the downstream end portion of the sheet by the cutting unit, the controller is configured to cause the cutting blade to retreat out of the conveyance path with respect to the moving direction.

3. The image forming system according to claim 1, wherein the cutting apparatus further includes a rotating blade configured to rotate on an axis extending in the width direction and cut the sheet such that the sheet being conveyed in the conveyance direction is cut along the conveyance direction.

4. The image forming system according to claim 3, wherein the cutting apparatus further includes an abutting member configured to be abutted with the rotating blade, and wherein a second cutting unit including the rotating blade and the abutting member is detachable from the cutting apparatus.

5. The image forming system according to claim 3, wherein the cutting apparatus further includes an abutting member configured to be abutted with the rotating blade, and wherein the controller is configured to cause a second cutting unit including the rotating blade and the abutting member to be moved in the width direction, to a position corresponding to a cutting amount at which the controller is instructed to cut the sheet.

6. The image forming system according to claim 1, wherein the cutting apparatus includes (i) a receiving port which is arranged on a side surface of the cutting apparatus on a first side in a horizontal direction and through which the cutting apparatus receives the sheet discharged from the image forming apparatus and (ii) a discharge port which is arranged on a side surface of the cutting apparatus on a second side opposite to the first side in the horizontal direction and through which the cutting apparatus discharges the sheet to the sheet processing apparatus, and wherein the cutting apparatus is configured to receive the sheet on which an image has been formed by the image forming apparatus and convey the sheet to the sheet processing apparatus through the conveyance path.

7. The image forming system according to claim 6, wherein the receiving port and the discharge port are arranged at a same height with each other.

8. The image forming system according to claim 1, wherein the cutting apparatus further includes a first tray on which sheets having been cut are stacked, and wherein the sheet processing apparatus includes a binding unit configured to bind a plurality of sheets and a second tray on which the plurality of the sheets having been bound by the binding unit is stacked.

9. The image forming system according to claim 1, wherein the sheet processing apparatus includes a binding unit configured to bind a plurality of sheets.

10. The image forming system according to claim 1, wherein the sheet processing apparatus includes a folding unit configured to fold a sheet.

11. The image forming system according to claim 1, wherein if the controller receives an instruction to cut the downstream end portion of the sheet by the cutting unit, the controller is configured to cause the roller to perform the skew correction operation.

12. The image forming system according to claim 1, wherein the cutting unit includes a cutting blade configured to move in a moving direction intersecting with both the conveyance direction and the width direction, and wherein the cutting unit is further configured to cut the sheet in the conveyance path such that an upstream end portion of the sheet in the conveyance direction is cut along the width direction.

13. The image forming system according to claim 1, wherein the cutting apparatus is configured to perform a cutting process of trimming four sides of the sheet.

14. The image forming system according to claim 1, wherein the image forming apparatus is configured to form the image on the sheet by using an electrophotographic system.

15. The image forming system according to claim 14, wherein the image forming apparatus includes a photosensitive member, and an intermediate transfer belt, and is configured to form the image on the sheet by using the electrophotographic system in which a toner image formed on the photosensitive member is transferred to the intermediate transfer belt and the toner image borne on the intermediate transfer belt is further transferred to the sheet, and wherein a cutting blade of the cutting apparatus is arranged at a position in a vertical direction that overlaps with a position of the intermediate transfer belt in the vertical direction.

16. An image forming system comprising:
an image forming apparatus configured to form an image on a sheet;
a cutting apparatus configured to cut the sheet one by one on which the image has been formed by the image forming apparatus;
a sheet processing apparatus configured to process the sheet received from the cutting apparatus; and
a controller,
wherein the cutting apparatus includes
a conveyance path through which the sheet received from the image forming apparatus is conveyed,
a skew correction unit configured to perform a skew correction operation in which a skew of the sheet is corrected before the sheet is cut by the cutting apparatus, and
a cutting unit configured to cut the sheet of which the skew has been corrected by the skew correction operation, such that a downstream end portion of the sheet in a conveyance direction of the sheet is cut along a width direction perpendicular to the conveyance direction,
wherein if the controller performs a job for outputting a product of a single sheet and receives an instruction not to cut the downstream end portion of the sheet by the cutting unit, the controller is configured to cause the skew correction unit not to perform the skew correction operation.

17. The image forming system according to claim 16, wherein the cutting apparatus is configured to perform a cutting process of trimming four sides of the sheet.

18. The image forming system according to claim 16, wherein the image forming apparatus is configured to form the image on the sheet by using an electrophotographic system.

19. A cutting apparatus comprising:
a conveyance path through which a sheet is conveyed, wherein the cutting apparatus is configured to be connected to an image forming apparatus and to a sheet processing apparatus such that the cutting apparatus receives the sheet on which an image has been formed by the image forming apparatus and convey the sheet to the sheet processing apparatus through the conveyance path;
a roller configured to convey the sheet in the conveyance path in a conveyance direction, the roller being configured to perform a skew correction operation in which a skew of the sheet is corrected before the sheet is cut by the cutting apparatus;
a cutting unit configured to cut the sheet in the conveyance path, such that a downstream end portion of the sheet in the conveyance direction is cut along a width direction perpendicular to the conveyance direction; and
a controller,
wherein if the controller performs a job for outputting a product of a single sheet and receives an instruction not to cut the downstream end portion of the sheet by the cutting unit, the controller is configured to cause the roller to convey the sheet toward the sheet processing apparatus without performing the skew correction operation.

20. The cutting apparatus according to claim 19, wherein if the controller receives an instruction to cut the downstream end portion of the sheet by the cutting unit, the controller is configured to cause the roller to perform the skew correction operation.

* * * * *